I. KORETZKY.
DRY BATTERY.
APPLICATION FILED APR. 4, 1913.

1,160,907.

Patented Nov. 16, 1915.

Witnesses
T. P. Britt
C. M. Gould

Inventor
Israel Koretzky
By Ger. C. Heinicke
Attorney

UNITED STATES PATENT OFFICE.

ISRAEL KORETZKY, OF NEW YORK, N. Y., ASSIGNOR TO L. J. MORRISON, OF NEW YORK, N. Y.

DRY BATTERY.

1,160,907.    Specification of Letters Patent.    Patented Nov. 16, 1915.

Application filed April 4, 1913. Serial No. 758,815.

*To all whom it may concern:*

Be it known that I, ISRAEL KORETZKY, a subject of the Czar of Russia, and a resident of New York, State of New York, have invented certain new and useful Improvements in Dry Batteries, of which the following is a full, clear, and exact specification.

This invention relates to improvements in dry batteries, particularly to that class of batteries which are especially adapted for use with flash-lights and electrical novelties or the like.

It is the object of the invention to reproduce a battery which shall have a longer life both in service and on the shelf, and which shall produce a much stronger light than the small dry batteries which are being produced at the present time. With this end in view I use in the construction of my improved battery recovered manganese, *i. e.* a chemically precipitated manganese, produced as a by-product in the manufacture of chlorid of lime and other chemical industries.

A practical embodiment of the invention is represented in the accompanying drawing, forming part of this specification, in which similar characters of reference indicate corresponding parts in all the views, the said invention being more fully described hereinafter and then pointed out in the appended claims.

Figure 1:
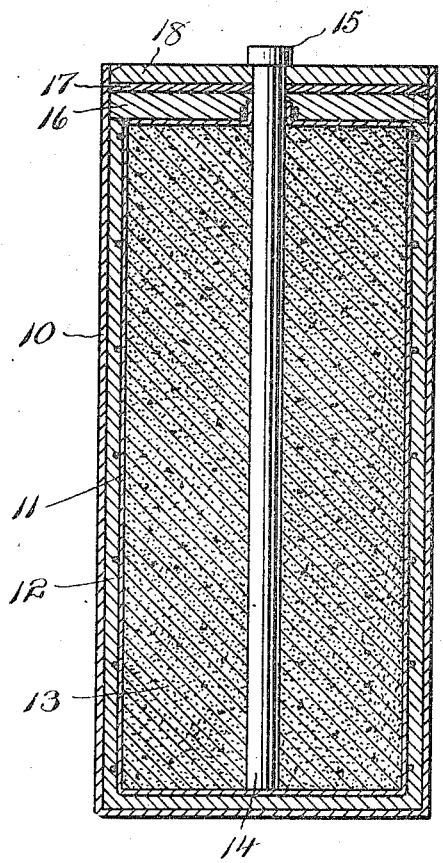
Figure 2:
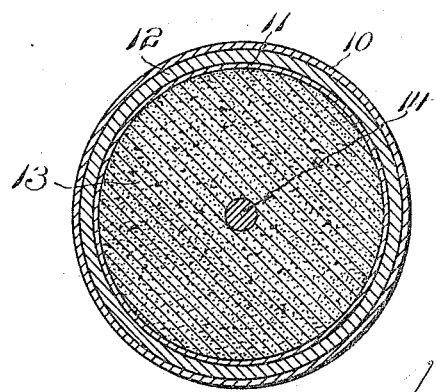

In the drawing: Figure 1 is a vertical longitudinal section of my improved dry battery, and Fig. 2 is a horizontal section through the same.

Each dry cell as shown includes a zinc cup 10 which is preferably but not necessarily circular in cross section. Within the cup is a bag 11 secured to the cup by a paste 12 which is used to fill up all the space between the walls of the zinc cup and the bag and acts as an insulating compound. The bag 11 contains a mass 13 of recovered, chemically precipitated manganese which is mixed with a very pure carbon and pressed into shape. Into this mass which, before pressing, is moistened with an electrolyte such as sal-ammoniac, or zinc chlorid in a solution of ammonium chlorid, zinc chlorid and sulfuric acid in water in desired quantity, is inserted a carbon electrode 14 provided at its upper outer end with a brass cap 15 or the like. The bag is securely tied to the carbon and paraffin 16 is poured into the casing from the top, whereafter a small piece of paste-board 17 is placed on top and the top is then sealed with a wax 18 of any well known and suitable kind.

The recovered or precipitated manganese 13, contained in bag 11, is the result of the following process, to wit: Amid, with a certain quantity of soda lye added, is stirred for a certain length of time and heated to a temperature of 35 degrees Celsius, when a given quantity of permanganate of potash is added and through cooling pipes the temperature is kept down to 35 degrees Celsius. Following a stirring process of this mixture for a period of 24 hours, a certain quantity of sulfuric acid of a strength of 35 degrees Baumé is added and then the solution is heated to 45 degrees Celsius. Then this mixture is drawn off into pressure tanks and then driven by air pressure through a set of filter presses where the manganese then is "recovered" or "separated". The recovered manganese is then carefully washed out for not less than 4 hours with pure clean water to remove all alkalis, when the recovered manganese is taken out of the presses into the drying room and dried at a temperature of not to exceed 60 degrees Celsius, after drying the recovered or precipitated manganese is then ready to be used in the manufacture of battery cells. The substance resulting from the foregoing process is known chemically in the trade and art as "recovered manganese" and as such is a well-known commodity of commerce. It is in color from blue to bluish black. It is chemically pure, soluble in muriatic acid, and partly soluble in sulfuric and nitric acid. Actual tests of this particular product show that recovered manganese is an entirely different product from the so-called pyrolusite, as it differs in its analysis and its physical and chemical properties, and action; that pyrolusite has a specific gravity of between 4 and 5, according to purity and that recovered manganese varies in specific gravity from 1.8 to 2.2 according to the care used in its preparation; and that recovered manganese is much more readily soluble in acids than the ordinary pyrolusite. This recovered manganese is not what might ordinarily be termed a homogeneous chemical product, and a number of chemical analyses have shown the presence of the following chemical compounds, viz, $MnO_2$; $Mn_2O_3$; $Mn_3O_4$ and other manganese salts in small quantities, besides traces of caustics and insoluble matters.

It is understood that changes may be made in the form and dimensions of the dry battery or in the proportions of the parts constituting the same or in its material, and the proportions of mixture, without departing from the scope and purpose of the invention, therefore I do not wish to be limited to the particular form of dry battery herein described and shown.

Having thus described my invention, I claim:

1. In a galvanic cell comprising positive and negative elements, a depolarizing mass composed of recovered manganese.

2. In a galvanic cell comprising positive and negative elements, a depolarizing mass composed of recovered manganese, mixed with a very pure carbon, moistened with an electrolyte and pressed into shape.

In testimony whereof I affix my signature in presence of two witnesses.

ISRAEL KORETZKY.

Witnesses:
L. J. MORRISON,
FLORENCE GREER.